Oct. 24, 1950     G. W. PONTIUS, III     2,526,968

BRAKE PRESSURE SELECTOR DEVICE

Filed Nov. 8, 1945

INVENTOR.
GEORGE W. PONTIUS III
BY Cecil J. Arens

ATTORNEY

Patented Oct. 24, 1950

2,526,968

UNITED STATES PATENT OFFICE 2,526,968

BRAKE PRESSURE SELECTOR DEVICE

George W. Pontius, III, South Bend, Ind.

Application November 8, 1945, Serial No. 627,428

11 Claims. (Cl. 188—152)

This invention relates to fluid pressure braking systems and more particularly to braking systems which may be altered to meet the changing road surface conditions.

Broadly, the invention comprehends a fluid pressure braking system for motor vehicles embodying means for varying the braking effect of the front wheels with respect to the braking effect of the rear wheels for varying conditions of vehicle load distribution.

An object of the invention is to provide a fluid pressure braking system for a motor vehicle operative to change the ratio of the braking effect between the brakes associated with the rear wheels of the vehicle and the brakes associated with the front wheels of the vehicle.

Another object of the invention resides in the provision of means for use in a hydraulic brake system to insure a solid column of fluid in all parts of the system during brake application.

Another object of the invention resides in the provision of control means for a brake system on an automotive vehicle which varies the braking effect applied to the front and rear brakes and which connects the entire system to a reservoir to replenish the system with fluid after each brake application.

Figure 1:
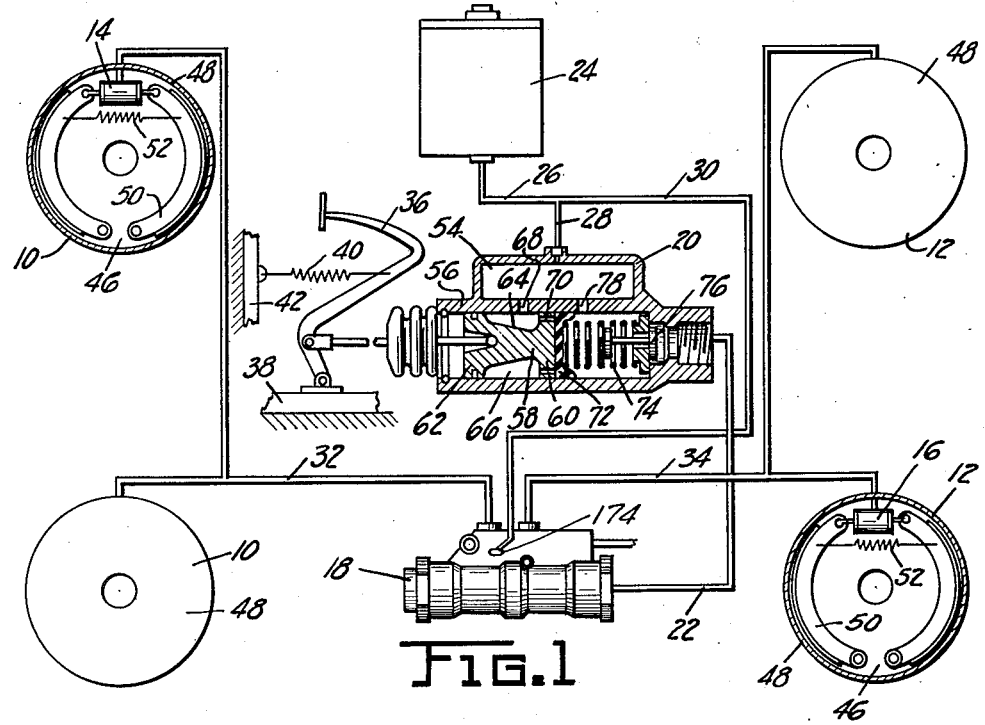
Figure 2:
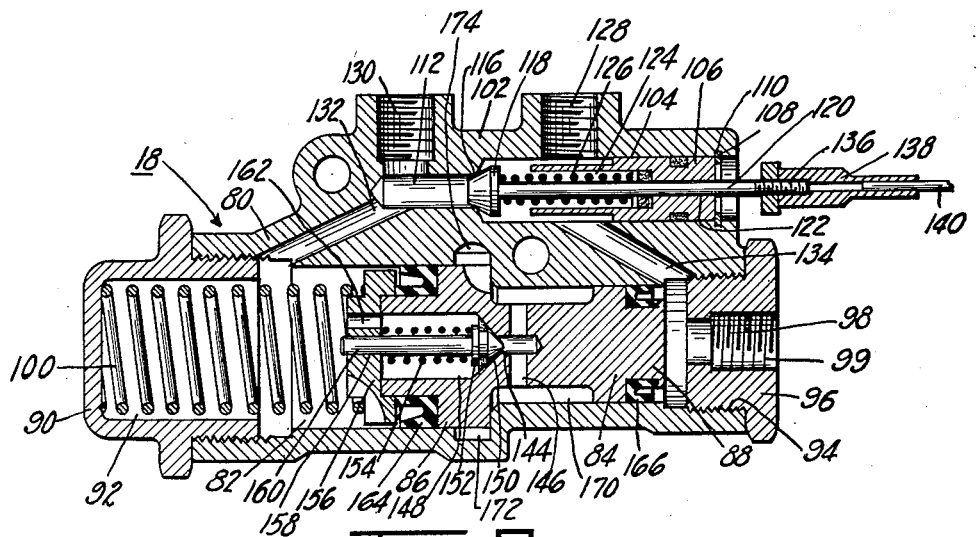

The above and other objects and features of the invention will be apparent from the following description of the apparatus taken in connection with the accompanying drawing which form a part of the system and, in which:

Figure 1 is a diagrammatical illustration of a fluid pressure braking system embodying the invention; and Figure 2 is a longitudinal sectional view of the brake selector valve of the invention.

Referring in detail to the drawing, it will be seen that the device of the invention is illustrated in connection with an automobile having front and rear brakes 10 and 12 arranged to be actuated by motors 14 and 16, respectively.

For actuating the motors 14 and 16 of the brakes the vehicle, not shown, is equipped with a hydraulic system comprising my novel brake pressure selector valve 18, a master brake cylinder 20 having a conduit or connection 22 to one end of the brake selector valve, and a reservoir 24 having a conduit 26 which connects branches 28 and 30 arranged to communicate the reservoir with the master cylinder 20 and the brake pressure selector valve 18 respectively. Conduits 32 and 34 connect the brake pressure selector valve to the front and rear brakes, respectively. The master brake cylinder or fluid pressure producing device 20 is of conventional type arranged to be operated by a foot lever 36 pivoted on a suitable support 38 and connected by a tension spring 40 to a fixed support 42.

The brakes may be of any conventional type each including a fixed support or backing plate 46 arranged to be secured to an axle housing, a rotatable drum 48 associated with the backing plate and adapted to be secured to a rotatable wheel, not shown, a pair of flange elements or shoes 50 pivoted on the backing plate 46, and one of the motors 14 or 16 being mounted on the backing plate between the friction elements 50 and operative to spread the elements into engagement with the drum 48 against the resistance of a tension spring 52 connecting the elements or shoes 50.

The master brake cylinder 20 comprises a reservoir 54, and a cylinder portion 56 in which a piston 58 is reciprocable. The piston 58 is provided with a head 60, a skirt portion 62 and a reduced body portion 64 joining the head and skirt portion. The reduced portion 64 forms an annular chamber 66 in the cylinder which is in communication with the reservoir 54 through a passage 68. The head 60 contains a plurality of ports 70 which lead from the annular chamber 66 to the back side of a sealing cup 72 carried by the piston head. A spring 74 has one of its ends abutting the sealing cup and its other end abutting a residual check valve 76 to urge the piston to a normally released position and to maintain pressure on the residual check valve. The residual check valve is of conventional type. To compensate for expansion and contraction of the fluid ahead of the sealing cup 72 a port 78 communicates the reservoir 54 with the cylinder portion 56, as shown.

The brake pressure selector device 18 comprises a body member 80 having a stepped cylinder 82 therein to accommodate a piston 84 provided with a large diameter head 86 and a small diameter head 88. One end of the cylinder is closed with a cap 90 drilled at 92, and the other end of the cylinder is threaded at 94 to receive a plug 96 drilled and threaded at 98 to provide a port 99 to threadedly engage the conduit 22 which communicates with the master cylinder 20. The cap 90 is arranged in the end of the cylinder so that the drilled portion 92 receives one end of a spring 100 which has its free end abutting the enlarged diameter head 86 of piston 84 to thereby normally bias the same toward one end of the cylinder. The spring 100 is heavier than the spring 52 of the motors in order to return the piston 84 to its normal position in the cylinder before the pistons, not shown, in the motor 14 have been returned to their normal position, when the pressure applied through the fluid by the pressure producing device to the small diameter head 88 has been released.

The body member 80 has a thick wall portion 102 integral with the cylinder 82 and formed on one side thereof. The wall is bored at 104 to receive a valve guide 106 held within the bore by a split washer 108 engaging a recess 110 of the bore. A second bore 112, of smaller diameter than bore 104, is drilled coaxially with the latter bore and connects the same to provide a valve seat 116 for a valve head 118. A shaft 120, integral with the valve head 118 is slidably received by a longitudinally drilled opening 122 in the valve guide 106. The valve guide is counterbored at 124 coaxially with the drilled opening 122 to receive a spring 126, the free end of which engages the valve head 118 to normally bias the same toward the seat 116. A port 128 formed in the body member communicates with one end of the bore 104 and is adapted to connect the conduit 34 to the brake selector valve. A port 130 formed in the body member communicates with the bore 112 and is adapted to connect the conduit 32 to the brake selector valve. A passage 132 connects the bore 112 to that end of the cylinder 82 in which the large diameter head 86 of the piston 84 is disposed. A passage 134 connects said one end of the bore 104 to that end of the cylinder 82 in which the small diameter head 88 of the piston 84 is located. The passage 134 forms one of a series of bores which provide communication between the port 99 and the ports 128 and 130.

In order that the brake pressure selector valve may be remotely located in the vehicle, not shown, the shaft 120 is threaded at 136 to engage an adaptor 138 arranged to receive one end of a cable 140 which has its other end terminating at some point in the vehicle accessible to the operator. To connect the front and rear brakes so that the braking effect will be the same, the operator merely pulls on the cable hard enough to overcome the force of the spring 126 to thereby unseat valve head 118. Unseating of the valve head 118 connects port 130 directly to port 99.

Since the spring 100 is made heavier than the spring 52 of the brake motors so that the piston 84 will return to its normal position before the pistons, not shown, of the motor 14 return to their normal position, there will be a tendency to create a vacuum in the system between the motor 14 and the end of the cylinder 82 in which the large diameter head of the piston is located. This condition is utilized to force oil from the reservoir 24, which is subjected to atmospheric pressure, into that part of the system tending toward vacuum. To enable oil to be fed from the reservoir 24 into the enlarged end of the stepped cylinder 82 the piston 84 is bored longitudinally at 144 to intersect a plurality of diametral bores 146. The bore 144 is enlarged at 148 to form a valve seat 150 on which seats a poppet valve 152 normally urged toward valve seat 150 by a spring 154. A cap-like element 156 is secured to the large diameter head of the piston and is drilled at 158 to receive a valve stem 160, integral with the valve 152, to guide the same onto its seat 150. The cap-like element is drilled at 162 for the passage of fluid to the large end of the stepped cylinder. The piston 84 is equipped with sealing cups 164 and 166 at its ends 86 and 88.

The diametral bores 146 connect the longitudinal bore 144 with an annulus 170 disposed between the ends of the piston 84. A recess 172 in the large portion of the stepped cylinder is in communication with port 174 which is connected to the reservoir through the conduits 28 and 30. The arrangement of the annulus 170 and the recess 172 is such that there is communication therebetween at all times notwithstanding the relative position of piston 84 in the cylinder. That is, the axial length of the annulus is such as to communicate with the recess throughout the entire stroke of the piston.

Operation and function of the system is as follows:

With the parts of the master brake cylinder and the brake pressure selector device in the positions shown in the drawing let us assume that the operator wishes to apply the front and rear brakes. Also let us assume that the load distribution of the vehicle requires less braking force on the front wheels than on the rear wheels. This is obtained through the use of the stepped piston 84 which acts to reduce master cylinder line pressure by the ratio of its two areas. It will be noted that the valve 118 is closed at this time and the vehicle is empty or partially loaded.

The operator merely depresses the foot pedal 36, advancing piston 58 of the master brake cylinder forward, thereby putting the fluid in the system under pressure. The force transmitted through the fluid in conduit 22 acts undiminished on the small diameter head 88 and on the rear brakes. The force acting on the small diameter head 88 moves the piston against the spring 100 and puts the fluid under pressure in conduit 32 which connects the front wheel brakes. Upon release of the brake pedal 36 the pistons 58 and 84 are returned to their normal positions by the springs 74 and 100, respectively. To replenish the system with oil and to insure an adequate supply of fluid in the conduits 22 and 34 after each braking operation the ports 70 in the head of piston 58 are uncovered during the return stroke of the piston to allow oil to be forced into the system. However, with valve 118 closed the conduit 32 is isolated from the rest of the system except through port 174 and past valve 152 which is normally closed. To insure enough fluid in that part of the system including conduit 32 to operate the front brakes, valve 118 is constructed and arranged to unseat in response to differential pressure to permit fluid from reservoir 24 to be forced into said conduit 32 during the return stroke of the piston 84. This pressure differential across valve 152 is produced by piston 84 returning to its normal position faster than the pistons of the motor 14 which tends to create vacuum in that part of the system, and atmospheric pressure acting in the fluid reservoir 24. The excess fluid which is forced into the front wheel brakes and conduit 32 to replenish that part of the system is returned to the reservoir past valve 118 when the pistons in the front wheel motor return to their normal positions. Spring 126 is selected to maintain a predetermined residual pressure in conduit 32 and the motors on the front wheel brakes. This novel arrangement of replenishing the entire braking system with oil after each braking application minimizes brake failures caused by inadequate fluid in the system.

Should it be desired to apply the same braking force to the front and rear brakes, when the vehicle is loaded, the operator pulls on cable 140 to unseat valve 118 which communicates the front brakes directly with the master brake cylinder.

Although the invention has been described in connection with certain specific embodiments, the principles are susceptible of numerous other applications that will readily occur to persons skilled in the art. The invention is, therefore, to be limited only as indicated by the scope of the appended claims.

Having thus described the various features of the invention, what I claim as new and desire by Letters Patent is:

1. In a fluid pressure braking system, a pressure producing device having a member arranged to be moved in a pressure producing direction, two sets of brakes connected to the device to be operated thereby, a brake pressure selector device connected between the pressure producing device and one of the sets of brakes including means for varying the pressure of the fluid supplied to one of the sets of brakes from that supplied to the other set of brakes, said pressure varying means creating a pressure on said one set of brakes during movement of the member in a pressure producing direction and tending to create a vacuum in said one set of brakes when said member is released, a fluid reservoir having connections to the pressure producing device and to the said one set of brakes and subjected to atmospheric pressure, means associated with the brake selector device and operator operated for selectively including or excluding said pressure varying means, and means normally closing the connection to the said one set of brakes, said means being controlled by differential pressure acting thereon upon release of said member, for opening the connection to said one set of brakes to connect the same to reservoir after a braking application.

2. In a fluid pressure braking system, a pressure producing device having a member arranged to be moved in a pressure producing direction, two sets of brakes connected to the device to be operated thereby, a brake pressure selector device connected between the pressure producing device and one of the sets of brakes including means for varying the pressure of the fluid supplied to one of the sets of brakes from that supplied to the other set of brakes, said pressure varying means creating a pressure on said one set of brakes during movement of the member in a pressure producing direction and tending to create a vacuum in said one set of brakes when said member is released, a fluid reservoir having connections to the pressure producing device and to the said one set of brakes and subjected to atmospheric pressure, means associated with the brake selector device and operator operated for selectively including or excluding said pressure varying means, and a valve normally seated in the connection to the said one set of brakes, said valve being urged toward its seat by a variable pressure and away from its seat by the atmospheric pressure in the reservoir, whereby said valve is unseated by differential pressure acting thereon upon release of said member.

3. In a fluid pressure braking system, a pressure producing device, two sets of brakes connected to the device to be operated thereby, a brake pressure selector device connected between the pressure producing device and one of the sets of brakes including means for varying the pressure of the fluid supplied to one of said sets of brakes from that supplied to the other of said sets of brakes, said means comprising a piston normally urged in a brake releasing direction and having ends of different effective areas, said piston having one of its ends subjected to pressure from the pressure producing device and its other end arranged to put fluid under pressure in said one set of brakes when said piston is urged in a brake applying direction, said piston being arranged so that when it is released for return to its normal position it tends to create a vacuum on said one set of brakes, a passage connecting said one end of the piston to the said other end thereof and to the said one set of brakes, a valve in the passage constructed and arranged to be operator operated for selectively including or excluding said pressure varying means, a reservoir subjected to atmospheric pressure and having a conduit connected to the said one set of brakes, and control means in the conduit normally closed and operated by differential pressure during the return of the piston to its normal position for supplying fluid to said one set of brakes.

4. In a fluid pressure braking system, a pressure producing device, two sets of brakes connected to the device to be operated thereby, a brake pressure selector device connected between the pressure producing device and one of the sets of brakes including means for varying the pressure of the fluid supplied to one of said sets of brakes from that supplied to the other of said sets of brakes, said means comprising a piston normally urged in a brake releasing direction and having ends of different effective areas, said piston having one of its ends subjected to pressure from the pressure producing device and its other end arranged to put fluid under pressure in said one set of brakes when said piston is urged in a brake applying direction, said piston being arranged so that when it is released for return to its normal position it tends to create a vacuum on said one set of brakes, a passage connecting said one end of the piston to the said other end thereof and to the said one set of brakes, a valve in the passage constructed and arranged to be operator operated for selectively including or excluding said pressure varying means, a reservoir subjected to atmospheric pressure and having a conduit connected to the said one set of brakes, and control means carried by said piston and arranged to normally cut off the fluid through said conduit to the reservoir, said control means being responsive to differential pressure acting thereon during the return of the piston to its normal position, for supplying fluid to said one set of brakes.

5. In a fluid pressure braking system, a pressure producing device, two sets of brakes connected to the device to be operated thereby, a brake pressure selector device connected between the pressure producing device and one of the sets of brakes including means for varying the pressure of the fluid supplied to one of said sets of brakes from that supplied to the other of said sets of brakes, said means comprising a piston normally urged in a brake releasing direction and having ends of different effective areas, said piston having one of its ends subjected to pressure from the pressure producing device and its other end arranged to put fluid under pressure in said one set of brakes when said piston is urged in a brake applying direction, said piston being arranged so that when it is released for return to its normal position it tends to create a vacuum on said one set of brakes, a passage connecting said one end of the piston to the said other end thereof and to the said one set of brakes, a valve in the passage constructed and arranged to be operator operated for selectively including or excluding said pressure varying means, a reservoir subjected to atmospheric pressure and having a conduit connected to the said other end of the piston and to said one set of brakes, and valve means located in said piston and arranged to normally seat to close the conduit to flow, said valve means being responsive to differential pressure acting thereon during the return of the piston to its normal position to unseat said valve to open the conduit to flow from the reservoir.

6. In a fluid pressure braking system, a pressure producing device, two sets of brakes connected to the device to be operated thereby, a brake pressure selector device connected between the pressure producing device and one of the sets of brakes including means for varying the pressure of the fluid supplied to one of said sets of brakes from that supplied to the other of said sets of brakes, said means comprising a piston normally spring urged in a brake releasing direction and having ends of different effective areas, said piston having one of its ends subjected to pressure from the pressure producing device and its other end arranged to put fluid under pressure in said one set of brakes when said piston is urged in a brake applying direction, said piston being arranged so that when it is released for return to its normal position it tends to create a vacuum on said one set of brakes, a passage connecting said one end of the piston to the said other end thereof and to the said one set of brakes, a valve in the passage constructed and arranged to be remotely operated for selectively including or excluding said pressure varying means, a reservoir subjected to atmospheric pressure and having a conduit connected to the said one set of brakes, and a valve in the conduit normally spring seated, said valve being carried by the piston and responsive to differential pressure acting thereon during the return of the piston to its normal position to unseat said valve to open the conduit to flow from the reservoir.

7. In a fluid pressure braking system, a pressure producing device, two sets of brakes connected to the device to be operated thereby, a brake pressure selector device connected between the pressure producing device and one of the sets of brakes including means for varying the pressure of the fluid supplied to one of said sets of brakes from that supplied to the other of said sets of brakes, said means comprising a piston normally urged in a brake releasing direction and having ends of different effective areas, said piston having one of its ends subjected to pressure from the pressure producing device and its other end arranged to put fluid under pressure in said one set of brakes when said piston is urged in a brake applying direction, said piston being arranged so that when it is released for return to its normal position it tends to create a vacuum on said one set of brakes, a passage connecting said one end of the piston to the said other end thereof and to the said one set of brakes, a valve in the passage constructed and arranged to be operator operated for selectively including or excluding said pressure varying means, a reservoir subjected to atmospheric pressure and having a conduit connected to the said one set of brakes, and valve means located in said piston and arranged to normally seat to close the conduit to flow, said valve means being responsive to differential pressure acting thereon during the return of the piston to its normal position to unseat said valve to open the conduit to flow from the reservoir, said operator operated valve being constituted to act as a relief valve to return excess fluid, which has entered said one set of brakes, to the reservoir.

8. In a fluid pressure braking system, a pressure producing device having means movable from a normally brake releasing position to a brake applying position, a brake pressure selector device connected to said pressure producing device, a first set of brakes, connected to said brake pressure selector, a second set of brakes connected to the pressure producing device, said pressure selector device including a piston having ends of different effective areas for varying the pressure of the fluid supplied to said first set of brakes from that supplied to the said second set of brakes, said piston being normally biased in a direction releasing pressure in said first set of brakes and responsive to the movable means of said pressure producing device for supplying pressure to said first set of brakes, said piston being arranged so that when it is released for return to its normal position it tends to create a vacuum on said one set of brakes, a passage connecting the ends of the piston, a manually controlled valve in the passage normally seated and constructed and arranged to be unseated when it is desired to connect the first set of brakes to the direct pressure of the pressure producing device, a reservoir subjected to atmospheric pressure and having fluid connections to said first and second set of brakes, said pressure producing device including means normally closing the fluid connection to said second set of brakes, means for connecting said second set of brakes to the reservoir during return of the movable means of the pressure producing device to its normal position, and means carried by said piston for controlling the flow in the connection to said first set of brakes and comprising a valve normally seated and responsive to differential pressure acting thereon during the return of the piston to its normal position to unseat said valve to open the connection to flow from the reservoir, said manually controlled valve being constituted to act as a relief valve to return excess fluid, which has entered said one set of brakes, to the reservoir.

9. In a fluid pressure braking system, a pressure producing device, a set of brakes having two connections to the pressure producing device, a brake pressure selector device in one of the connections between some of the brakes of the set and the pressure producing device for varying the pressure of the fluid supplied to said some of the brakes, said brake pressure selector device including means responsive to pressure developed by the pressure producing device for creating a pressure on said some of the brakes of said set different from the developed pressure, said means responsive to the decay of the developed pressure for producing a low pressure in said some of the brakes of said set, a reservoir having a passage to said some of the brakes of said set, valve means in said passage normally closing the same and subjected to atmospheric pressure on one side and said low pressure on the other side so as to be operated by the resultant differential pressure to thereby connect said some of the brakes of the set to the reservoir, and manually operated means associated with the brake selector device for connecting said some of the brakes of said set of brakes directly to the pressure developed by the pressure producing device.

10. A brake selector valve comprising a body having a bore therein, a piston in the bore having ends of different effective areas and normally biased toward one end of the bore, an inlet port in communication with said one end of the bore, an outlet port in communication with the other end of the bore, a passage connecting the ends of the bore, said piston arranged in the bore to respond to inlet pressure to move the piston toward said other end of the bore to put fluid in that end of the bore under a pressure different from the inlet pressure, manually operated means in the passage normally closing the same and arranged for selectively connecting said other end of the bore to inlet port pressure, and means responsive to differential pressure created by the return of the piston to said one end of the bore to thereby connect said other end of the bore in a manner to allow fluid to flow thereinto.

11. A brake pressure selector device for a fluid braking system comprising a body having an outlet port adapted to be connected to a set of brakes, an inlet port adapted to be connected to a source of high pressure, a reservoir port adapted to be connected to a supply of fluid under atmospheric pressure, a bore in the body having one end in communication with the outlet port and the other end in communication with the inlet port, a piston in the bore having ends of different areas and normally urged toward the end of the bore with which the inlet port communicates and movable toward the end of the bore with which the outlet port communicates in response to inlet port pressure, a passage connecting the ends of the bore, an operator operated valve normally seated in the passage for confining the inlet port pressure to that end of the piston adjacent the inlet port to cause the piston to move toward said other end of the bore to put the outlet port under a pressure different from the inlet port pressure, the unseating of said valve communicates the inlet port with the outlet port to cause the pressure in the latter port to substantially equal that in the former, and means including a spring biased valve responsive to a difference in pressure acting across the valve for connecting said reservoir port with the end of the cylinder in communication with the outlet port when the piston is returned to its normal position in the bore.

GEORGE W. PONTIUS, III.

REFERENCES CITED

The following references are of record in the file of this patent:

UNITED STATES PATENTS

| Number | Name | Date |
|---|---|---|
| 2,144,020 | Hunt | Jan. 17, 1939 |
| 2,218,194 | Freeman | Oct. 15, 1940 |
| 2,219,765 | Chase | Oct. 29, 1940 |
| 2,321,479 | Freeman | June 8, 1943 |